United States Patent [19]

Hashiguchi

[11] 4,066,235
[45] Jan. 3, 1978

[54] BREAKAWAY MIRROR MOUNTING

[75] Inventor: Setsuo Hashiguchi, Yamato, Japan

[73] Assignee: Ichikoh Industries Limited, Tokyo, Japan

[21] Appl. No.: 636,744

[22] Filed: Dec. 1, 1975

Related U.S. Application Data

[63] Continuation-in-part of Ser. No. 574,086, May 2, 1975, abandoned, which is a continuation of Ser. No. 407,489, Oct. 18, 1973, abandoned.

[51] Int. Cl.² .............................................. B60R 1/02
[52] U.S. Cl. ................................ 248/482; 248/475 A
[58] Field of Search ................. 248/475 A, 479, 481, 248/DIG. 9; 403/2, 7; 52/98

[56] References Cited

U.S. PATENT DOCUMENTS

| 697,914 | 4/1902 | Griffin | 52/98 |
|---|---|---|---|
| 2,702,214 | 2/1955 | Turner | 403/7 |
| 2,899,703 | 8/1959 | Johnson | 16/86 A |
| 3,059,736 | 10/1962 | Boyd | 403/7 |
| 3,403,484 | 10/1968 | Redey | 52/98 |
| 3,436,049 | 4/1969 | De Claire et al. | 248/475 A |
| 3,599,926 | 8/1971 | Takahashi | 248/475 A |
| 3,628,296 | 12/1971 | Henry | 52/98 |
| 3,837,752 | 9/1974 | Shewchuk | 403/2 |

FOREIGN PATENT DOCUMENTS

| 1,234,025 | 6/1971 | United Kingdom | 248/475 A |

Primary Examiner—William H. Schultz
Attorney, Agent, or Firm—Cushman, Darby & Cushman

[57] ABSTRACT

An apparatus made of a synthetic resin for attaching, in breakaway fashion, a rear view mirror mounted within an automobile. A base member is attached to the automobile body and is provided with a thinned region having numerous tiny holes therein whereby when a substantial impact is applied to the mirror section, the base fractures in the thinned region causing the mirror device as a whole to break away from the base.

1 Claim, 7 Drawing Figures

BREAKAWAY MIRROR MOUNTING

This application is a continuation-in-part of Serial No. 574,086, filed May 2, 1975 and now abandoned, which is a continuation of Ser. No. 407,489, filed Oct. 18, 1973, and now also abondoned.

BACKGROUND OF THE INVENTION

1. Field of the Invention

The present invention is concerned with an apparatus for attaching a rear view mirror to the interior of a motor vehicle. More particularly, the present invention pertains to an apparatus made of a synthetic resin for attaching a rear view mirror proximate the driver's seat in such a way that in case of an unexpected impact, the mirror will readily break away from a supporting base member.

2. Description of the Prior Art

When a rear view mirror is undetachably fixed within, for example, the dirver's chamber of an automobile and the automobile is stopped suddenly for any reason, the driver or a passenger may hit the rear view mirror causing the mirror structure to break and/or personal injury to occur.

Accordingly, it is desirable to provide a rear view mirror device which functions such that at the time a considerable force is applied thereto, the device will readily break away from its base without being broken. It is well known, for example, to attach the supporting arm of a rear view mirror to the body of a motor vehicle via an easily breakable base member.

One such known apparatus is disclosed in Japanese Utility Model Publication No. Sho 45-28017 published on Oct. 28, 1970. In this apparatus, the supporting arm is fixed by bolts and nuts to a portion of a base member made of a synthetic resin designed to be attached to the body of an automobile. The marginal portion of this base member around the portion thereof to which the supporting arm is fixed is so formed as to have a lessened thickness. Whenever a certain magnitude of force is applied to this mirror device, said marginal portion of the base member will fracture, and accordingly the mirror and its supporting arm, together with that portion of the base member to which the arm is fixed, will break away from the body of the automobile.

The aforesaid known arrangement has the advantage that by adjusting the thickness of the thin marginal portion surrounding the region to which the supporting arm is fixed, the resistance of this thinned marginal portion against destructive force may be varied. However, in order to determine a required thickness for each type of base member material in order to obtain a desired resistance against destructive force, it is necessary to prepare, in the stage of trial manufacture, various dies for molding thinned portions of widely varying thickness. This leads to a high cost of trial manufacture. Furthermore, when a rear view mirror device attached to a base member and having a thin marginal portion is in use, the presence of this thinned portion tends to cause the base member to develop resonance with the vibration of the automobile carrying such device with the resultant drawback that a stationary reflection is not achieved. In this case where a prism mirror having a viewing field adjusting means is attached to the aforesaid base member, the vibration of the mirror becomes even more aggravated because of the fact that a considerable amount of weight is supported at the free end of the supporting arm in such a device. In the case of a break away type rear view mirror device another desirable function of the mirror assembly is that whenever a substantial amount of force is applied to the mirror in the direction of the wind shield, the mirror arrangement will break away before it hits the wind shield. In view of the fact, however, that with a known mirror device of the type just described, its support arm in general will pivot about a portion of the aforesaid thinned region momentarily, and thus the shearing force will not be distributed uniformly to the entire thinned region. As a result, the entire thinned region will not be destroyed instantaneously. The site which serves as a fulcrum for the pivotal motion of the arm, in particular, tends to act as a hinge for this motion of the arm. Thus, it is possible that the mirror device as a whole will not completely break away until the arm has been substantially displaced. In other words, with such a prior art arrangement the mirror device may hit the wind shield.

Another known arrangement for detachably securing a rear view mirror device within an automobile is shown in Japanese Utility Model Publication No. Sho 47-21793 published July 18, 1972. In this arrangement, a substantially cylindrical aperture is formed in the central portion of a base member used to attach the supporting arm of the mirror to the body of an automobile. A cylindrical nut is provided within said aperture. A plurality of thin plate-like ribs extending radially towards the outer wall of the nut from the inner wall of the aperture are provided to support said nut within the aperture. These respective members are molded as integral parts of the base member. The base member is fixed to the body of the automobile by bolts and nuts, and a bolt is screwed into the nut through a bolt-receiving hole formed in the bottom of the supporting arm of the mirror device. Thus, the mirror is attached to the body of the automobile.

The securing arrangement just described behaves such that whenever substantial impact forces are applied to the mirror, the ribs are destroyed so that the mirror device breaks away with the nut. A desired resistance to detachment is obtained by varying the ribs either in thickness or in number. As in the case of the previously described prior art, the determinination of the required thickness and number of ribs necessitates preparation of various kinds of dies in the stage of trial manufacture which, in turn, is very costly. Also, as in the case of the prior art discussed above, resonance develops during use and the resonance becomes more intensive when a heavy prism mirror is mounted on the supporting arm. Thus, the viewability of such a mirror device is poor. Also, as stated above, the attachment of the devices requires two cumbersome steps., i.e., fixing the base member to the body of an automobile and then fixing the supporting arm to the base. Thus, attaching a rear view mirror of this type is inefficient.

A further arrangement for detachably securing a rear view mirror to the body of an automobile is proposed in U.S. Pat. No. 3,599,926, dated Aug. 17, 1971. This arrangement is similar to that disclosed in the aforesaid Japanese Utility Model Publication Sho 45-28017 with the exception that the end of the supporting arm is large enough to cover the fragile portion of the base member. As discussed with respect to Japanese Utility Model Publication Sho 45-28017, the difficulty with this approach is that it is difficult to manufacture an attachment which will have sufficient thickness to prevent the rear view mirror from seriously vibrating while at the same time allowing it to break away when subjected to a reasonable force.

SUMMARY OF THE INVENTION

It is therefore, a primary object of the present invention to provide an attachment apparatus made of a synthetic resin for securing a rear view mirror to the body of a motor vehicle, which apparatus behaves such that whenever it is subjected to a substantial impact force, the mirror device will readily break away at the base of its supporting arm without this arm being broken.

Another object of the present invention is to provide a breakaway-type rear view mirror device of the type described which permits an easy and low cost determination in the stage of trial manufacture of the degree of breaking resistance of that portion of the device which is susceptible of being easily fractured.

Still another object of the present invention is to provide a breakaway type rear view mirror having minimum resonance in response to the vibration of the body of the automobile to which said device is attached even when a heavy mirror is mounted to the end of the supporting arm of the mirror device.

A further object of the present invention it to provide a breakaway type rear view mirror device which readily breaks away when a substantial impact force is applied thereto in any direction.

Still another object of the present invention is to provide a breakaway type rear view mirror device which will break away as a result of impact forces of substantially the same magnitude applied in any direction.

Yet another object of the present invention is to provide a rear view mirror device which can be easily attached to a supporting surface within an automobile.

A further object of the present invention is to provide a rear view mirror device wherein the mirror and the mirror supporting arm are adapted to be non-rotatably attached to the body of an automobile.

Other objects, features and advantages of the present invention will become apparent in view of the following detailed description when taken in conjunction with the accompanying drawings.

DETAILED DESCRIPTION OF THE PREFERRED EMBODIMENTS

Figure 1:
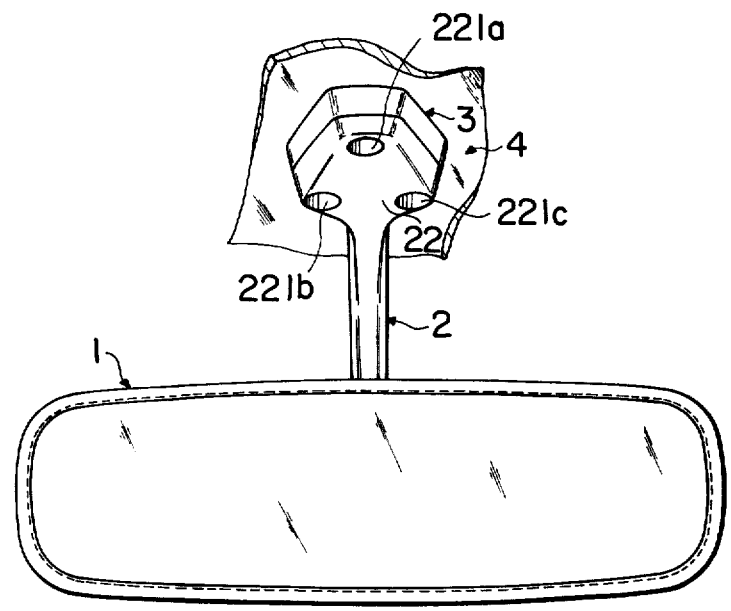
FIG. 1 is a front view of a breakaway type rear view mirror device for interior use in an attachment arrangement according to the present invention is employed.

It should be understood that like parts are designated by like reference numerals throughout the accompanying drawings.

Figure 2:
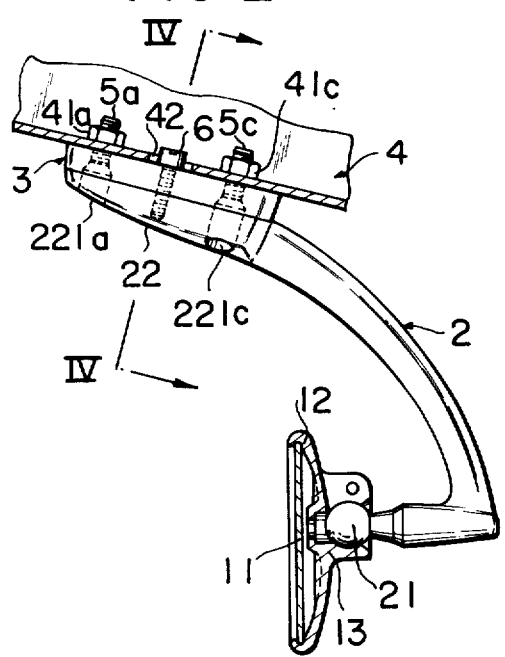
FIG. 2 is a side view of same, partly shown in section.

By referring to FIGS. 1 and 2, it will be appreciated that a mirror 1 is comprised of a mirror glass 11 and a mirror housing 12 made of a synthetic resin for holding said mirror glass 11. On the reverse side of this mirror housing 12 a socket 13 is formed integrally therewith.

A supporting arm 2 made of a synthetic resin is formed in a generally arcuate configuration. At one end of this arm a mirror supporting section is formed integrally with the arm. The free end of this mirror supporting section is formed in the shape of a ball 21. This ball 21 is received in socket 13 to constitute a ball joint, thus allowing the arm 2 to support the mirror 1 so as to enable a person to freely adjust the field of vision.

Figure 4:
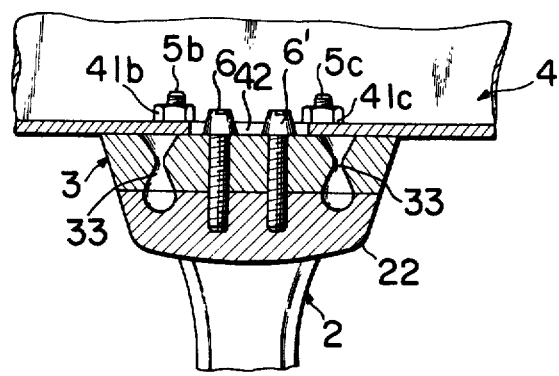
FIG. 4 is an enlarged sectional view taken along the line IV—IV in FIG. 2.

The other end of the arm 2 is formed into a substantially trapezoidal shaped portion 22. Portion 22 is provided with a substantially flat side surface having an aperture 221a in the vicinity of the top edge of the trapezoidal shape and two apertures 221b and 221c in the vicinity of the base of said trapezoidal shape for the insertion therethrough of bolts 5a, 5b and 5c which will be described later. These apertures 221a, 221b and 221c are of greater size than the heads of the bolts 5a, 5b and 5c. Portion 22 has two threaded holes 222 and 222' which are positioned substantially centrally thereof the holes being arranged along a line parallel to both the top and bottom edges of the trapezoid. These threaded holes 222 and 222' extend partially through portion 22 and receive screws 6 and 6' which will be described later. As shown in FIG. 4, a cavity is formed in the hole-containing surface of the portion 22 to facilitate the removal of supporting arm 2 from the die after the molding thereof.

Figure 3:
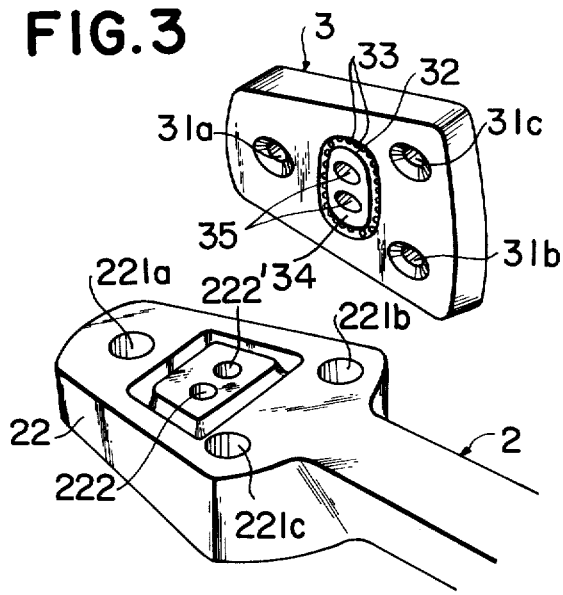
FIG. 3 is an exploded perspective view, on an enlarged scale, of both a portion of a mirror supporting arm and a base member of the attachment arrangement shown in FIGS. 1 and 2.

A base member 3 is formed with substantially the same trapezoidal contour and size as portion 22, as is shown in FIG. 3, to thereby provide a good appearance when this member and portion 22 are joined together. Base member 3 has apertures 31a, 31b and 31c at positions corresponding to those of the apertures 221a, 221b and 221c of portion 22. However, apertures 31a, 31b and 31c are slightly smaller than the heads of the bolts 5a, 5b and 5c but slightly greater than the threaded portions of these bolts, so that the base member 3 can be attached to the body of the automobile by the bolts. The portion of each of the apertures 31a, 31b and 31c adjacent portion 22 is formed to have a conical shape so as to be able to receive therein the head of said bolt. At approximately the central portion of the base member 3 a thinned region 32 of oval shape is provided by forming a V-shaped groove on opposite sides of member 3. Each of said V-shaped grooves has a depth which is less than one half the thickness of the base member 3, and the respective apexes of the opposing two V-shaped grooves are aligned relative to each other. The thinned region 32 is provided with numerous spaced tiny holes 33 inside this thinned region, in order that this thinned region 32 may be easily broken. These holes 33 extend between the V-shaped groove in one side of the base member 3 and the V-shaped groove in the other side of the base member. Each of these tiny holes 33 has a diameter smaller than the breadth of the thinned region 32. In that part 34 of the oval-shaped ring which is surrounded by the thinned region 32, there are provided, at positions corresponding to the threaded holes 222 and 222′ of the bottom portion 22, two bores 35 for receiving the two screws 6 and 6′.

The supporting arm 2 and the base member 3 are joined together, prior to being attached to the body of the automobile, by screws 6 and 6′ extending through bores 35 of the base member 3 into the threaded holes 222 and 222′ of portion 22 of the arm 2. It will be understood that by such a method of attachment the heads of these screws are safely hidden when the rear view mirror device is attached to the body of the automobile resulting in a good external appearance being obtained.

The arm 2 and the base member 3 which are joined together may be attached to the body of the automobile either directly or by the use of a conventional bracket 4 which is attached, in advance, to a position above and ahead of the driver's seat. This bracket 4 is provided with apertures at positions corresponding to the apertures 31a, 31b and 31c of the base member 3 for passing bolts 5a, 5b and 5c therethrough. On the reverse side of these apertures there are secured, at the time of manufacture, nuts 41a, 41b and 41c for threadably receiving the bolts 5a, 5b and 5c. Furthermore, in order to avoid any interference with the bracket 4 by the heads of the screws 6 and 6′ at the time the interconnected arm 2 and base member 3 are fixed to the bracket 4 by the bolts 5a, 5b and 5c, the bracket 4 is provided at positions corresponding to the positions of the screws 6 and 6′ with an opening 42 having a size larger than the size of the heads of the screws 6 and 6′.

As has been stated above, a breakaway type rear view mirror according to the present invention is assembled by securing both the supporting arm 2 and the base member 3, which have been secured to each other by the screws 6 and 6′, to the bracket 4 which has been fixed to the body of the automobile beforehand. This is accomplished by by passing the bolts 5a, 5b and 5c through the apertures 221a, 221b and 221c of the portion 22 of the arm 2 and also through the holes 31a, 31b and 31c in the base member 3 and by screwing these bolts through the nuts 41a, 41b and 41c until the heads of the bolts 5a, 5b and 5c engage the face of the member 3 which mates with portion 22. Thus the procedure involves nothing more than the single step of fastening the bolts 5a, 5b and 5c. Consequently, it is possible to carry out the operation of attaching a breakaway type rear view mirror to the interior of an automobile quickly and without difficulty. The supporting arm 2 is attached to the base member 3 by the two screws 6 and 6′ and therefore the mirror is non-rotatably secured to the body of an automobile.

Since a number of tiny holes 33 are provided in the thinned region 32, in the event that an external force of a magnitude greater than a predetermined value is applied to this thinned region 32, the thinned region 32 is fractured so that the rear view mirror device as a whole, together with the portion 34 of base member 3 surrounded by this thinned region 32, breaks away instantaneously.

Furthermore, during trial manufacture of the attachment apparatus of the present invention, any desired degree of resistance against the destructive force can be established by merely punching tiny holes of various diameters through said thinned region 32 at various different pitches. Therefore, different resistances to impact can be effected at a low cost without requiring a number of different dies.

Figure 5:
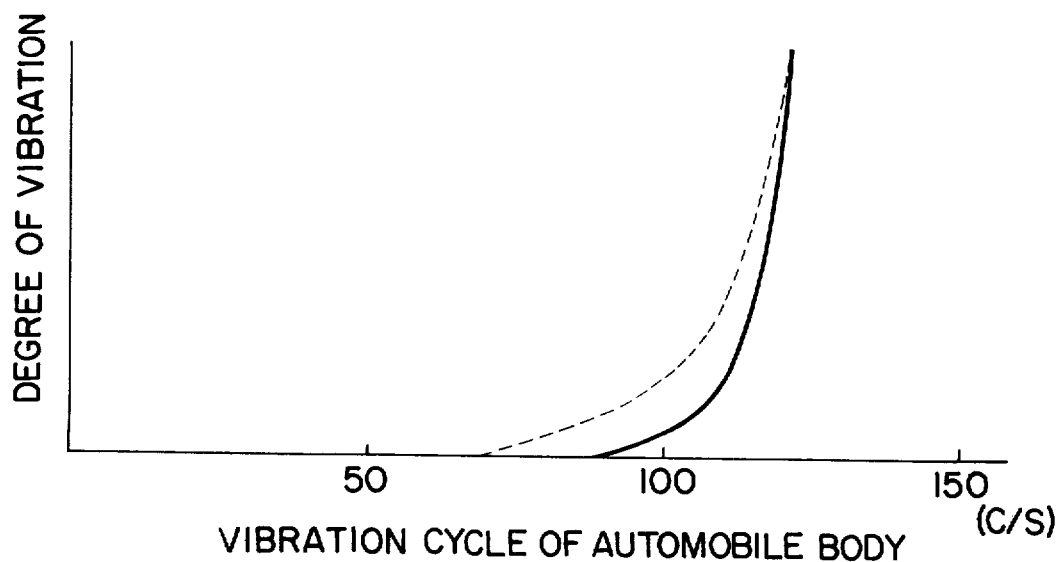
FIG. 5 is a chart intended for the comparison of the degree of resonance developed by the attachment arrangement of the present invention and that developed by a prior art arrangement.

A test was performed comparing the resonance produced by a prior art arrangement described above and by the apparatus of the present invention. The results are shown in FIG. 5. This comparison test was performed using the attachment apparatus of the first prior art example described above and the attachment apparatus of the present invention. Both had the same resistance to destructive impact force and carried mirror sections of the same weight at the free ends of the respective supporting arms. In FIG. 5, the vertical axis indicates the degree of vibration exerted by the mirror sections supported by the respective attachment arrangements, and the horizontal axis indicates the vibration cycles of the body of the automobile. The dotted line represents the response of the prior art structure, and the solid line indicates that of the present invention. Because of the fact that in the attachment apparatus of the present invention numerous tiny holes are formed in the thinned region 32, the thickness of this thinned region 32 necessary for obtaining a particular degree of resistance to destructive force is greater than the thickness of the thinned region of the prior art example previously described. Accordingly, as seen in FIG. 5, the attachment of the present invention will produce resonance of the mirror section to a much lesser degree than does the attachment apparatus of the prior art.

Figure 6:
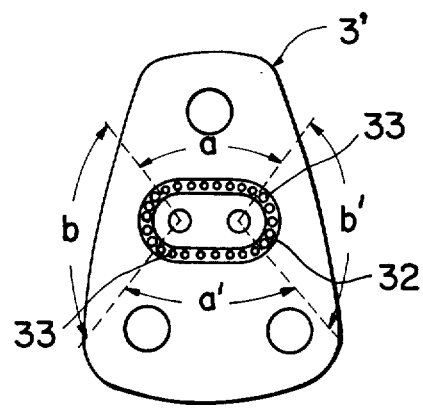
FIG. 6 is a plan view of another type of base member according to the present invention.

FIG. 6 shows another type of base member 3′ which has the same configuration as that of the previously described base member 3 with the exception of the size of the tiny holes 33. The base member 3′ has two groups of holes. The holes 33 in a first group are arranged in those portions of the oval groove 32 which have a small curvature, that is, the portions a and a′ in FIG. 6. The holes 33 in a second group have a larger diameter than those in portions a and a′ and are arranged in those portions of the oval groove 32 which have a larger curvature, that is, the portions b and b′ in FIG. 6. For example, the holes 33 arranged in the portions a and a′ have a diameter of 1.0 mm and the holes 33 arranged in the portions b and b′ have a diameter of 1.4 mm. Thus, the portions b and b′ of the thinned oval ring are weaker in mechanical strength.

It will be understood that if the fragile region thinned by the grooves 32 were given the same mechanical strength throughout, the amount of force applied to the mirror device in a direction endwise of oval grooves 32 which would be required to break away the mirror device would be greater than that applied in other directions. In other words, the breaking of the portions b and b′ of the oval groove 32 would require a larger force than the breaking of the portions a and a′. However, due to the arrangement of hole sizes as described above, portions a, a′, b, and b′ can be broken by a force of substantially the same magnitude.

Figure 7:
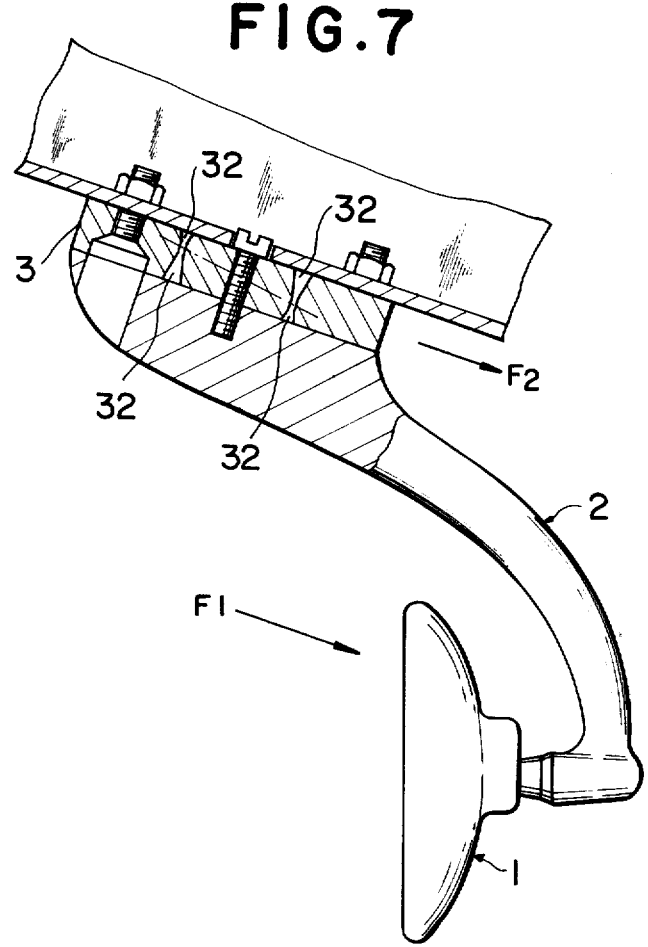
FIG. 7 is a side view of another type of the rear view mirror device according to the present invention, partly shown in section.

FIG. 7 shows a second embodiment of the present invention. The rear view mirror device of this embodiment has substantially the same construction as that of the device previously described with the exception that the oval V-shaped grooves 32 in the base member 3 do not have uniform depth. In other words, the planes in which the bottoms of the grooves 32 lie are parallel with one another and are slightly slanted with respect to the principal surfaces of the base member 3, as shown by the dot-and-dash line in FIG. 7. More specifically, the depth of the groove 32 on the side of the base member 3 remote from supporting arm 2 becomes greater as it extends towards the mirror section 1. In contrast to this, the depth of the groove 32 on the side of the base member 3 adjacent arm 2 becomes shallower as it extends towards the mirror section 1. That is to say, a plane on which the center of all the tiny holes lie is inclined towards the mirror section 1.

It will be understood that when force is applied to the mirror device of FIG. 7 in the direction $F_1$, i.e., parallel to the plane of the base member, such force causes the base member to be urged in the direction $F_2$. If the oval grooves 32 had the same depth, it would be difficult to shear the oval thinned region by the force applied in the direction $F_1$. However, since the plane of the thinned region is inclined with respect to the principal surfaces of the base member, the thinned region is easily fractured even when force is applied in a direction parallel to the principal surfaces of the base member.

As described above, according to the present invention, whenever an impact greater than a predetermined magnitude is applied to the rear view mirror device in any direction, the mirror device readily detaches from the body of an automobile due to the perforations in the thinned region of the base member which may be of varying diameter or slanted with respect to the principal surfaces of the base member.

I claim:

1. A breakaway mounting for a mirror attached to one end of a supporting arm, said mounting comprising:

a base member;

continuous grooves formed in a matching relationship on opposite surfaces of said base member, said grooves defining a thinned region therebetween and having varying depths whereby the bottoms of the respective grooves lie in substantially parallel planes which are inclined with respect to the planes of said base member surfaces;

a plurality of spaced apertures in said thinned region extending between said grooves;

means for interconnecting a portion of the base member enclosed by said grooves to the end of said supporting arm opposite that to which the mirror is attached, said opposite end comprising an enlarged arm portion having a contour substantially corresponding to that of the base member; and means for joining the remaining portion of the base member to an external support whereby when said mounting is exposed to a force in excess of a predetermined value, said base member fractures at its thinned region permitting the mirror, the supporting arm and the portion of the base member enclosed by the grooves to break away from the remaining portion of the base member, said means for joining the remaining portion of the base member to the external support comprising: a plurality of coaxial apertures through said enlarged arm portion, the remaining portion of the base member and the external support; and bolting means located within said apertures, said apertures in the enlarged arm portion having dimensions greater than those of the bolting means therein.

* * * * *